US008799456B2

(12) United States Patent
de Jager et al.

(10) Patent No.: US 8,799,456 B2
(45) Date of Patent: Aug. 5, 2014

(54) FAST DEVICE CLASSIFICATION

(75) Inventors: Douglas de Jager, London (GB); Simon Overell, Hitchin (GB)

(73) Assignee: Spidercrunch Limited, London (GB)

( * ) Notice: Subject to any disclaimer, the term of this patent is extended or adjusted under 35 U.S.C. 154(b) by 25 days.

(21) Appl. No.: 13/069,977

(22) Filed: Mar. 23, 2011

(65) Prior Publication Data

US 2012/0246293 A1    Sep. 27, 2012

(51) Int. Cl.
*G06F 12/14* (2006.01)
*H04L 29/06* (2006.01)
*G06Q 30/02* (2012.01)
*G06F 21/55* (2013.01)

(52) U.S. Cl.
CPC .......... *G06F 21/552* (2013.01); *H04L 63/1408* (2013.01); *G06F 2221/2119* (2013.01); *G06Q 30/0241* (2013.01); *G06F 2221/2133* (2013.01)
USPC ........................................................ 709/224

(58) Field of Classification Search
None
See application file for complete search history.

(56) References Cited

U.S. PATENT DOCUMENTS

| | | | | |
|---|---|---|---|---|
| 7,657,626 B1 * | 2/2010 | Zwicky | ........................ | 709/224 |
| 7,840,578 B2 * | 11/2010 | Ha et al. | ........................ | 707/758 |
| 8,103,543 B1 * | 1/2012 | Zwicky | ..................... | 705/14.26 |
| 8,135,615 B2 * | 3/2012 | Bradley et al. | ............. | 705/14.26 |
| 8,160,924 B2 * | 4/2012 | Daniels et al. | ............. | 705/14.47 |
| 8,244,752 B2 * | 8/2012 | Buehrer et al. | ............... | 707/769 |
| 2005/0060295 A1 | 3/2005 | Gould et al. | | |
| 2007/0169194 A1 * | 7/2007 | Church et al. | ................... | 726/23 |
| 2007/0255821 A1 | 11/2007 | Ge et al. | | |
| 2008/0229421 A1 | 9/2008 | Hudis et al. | | |
| 2009/0299967 A1 | 12/2009 | Li et al. | | |
| 2010/0082400 A1 | 4/2010 | Bagherjeiran et al. | | |
| 2010/0228852 A1 * | 9/2010 | Gemelos et al. | .............. | 709/224 |
| 2010/0235915 A1 * | 9/2010 | Memon et al. | ................... | 726/23 |

FOREIGN PATENT DOCUMENTS

| | | |
|---|---|---|
| EP | 2 164 021 A1 | 3/2010 |
| WO | 2008/076234 A1 | 6/2008 |
| WO | 2010/037955 A1 | 4/2010 |

OTHER PUBLICATIONS

Eduardo Rocha et al., "Identification of Anomalies on Encrypted Communications based on Multi-Scale Behavior Modeling", Ultra Modern Telecommunications and Control Systems and Workshops (ICUMT), 2011 3rd International Congress ON, IEEE, Oct. 5, 2011, XP032021331, ISBN: 978-1-4577-0682-0, 7pgs.

(Continued)

*Primary Examiner* — Hassan Phillips
*Assistant Examiner* — Omeed D Rahgozar
(74) *Attorney, Agent, or Firm* — Foley and Lardner LLP; John D. Lanza

(57) ABSTRACT

In a system in which one or more client devices 10 access web servers 20 over a network 40, a classification server 30 is provided to assist in identifying the nature of the agent controlling the client devices 10. In particular, the classification server 30 monitors events that occur as a client device 10 accesses content on a web server 20, and uses a record of these events to classify the client device 10. This classification occurs when a classification time, generated in dependence on the events that have already taken place, is reached. The classification time represents the earliest time at which a classification can be made with a predetermined level of confidence.

12 Claims, 13 Drawing Sheets

(56) References Cited

OTHER PUBLICATIONS

Chamila Walgampaya et al., "Cracking The Smart ClickBot", Web Systems Evolution (WSE), 2011 13th IEEE International Symposium ON, IEEE, Sep. 30, 2011, XP032010563, DOI: 10.1109/WSE.2011.6081830, ISBN: 978-1-4577-0699-8, (pp. 125-134, 5 pages total).

Wei Lu et al., "BotCop: An Online Botnet Traffic Classifier", 2009 Seventh Annual Communication Networks and Services Research Conference, 2009. CNSR, IEEE, Piscataway, NJ, USA, May 11, 2009, XP031456645, ISBN: 978-1-4244-4155-6, (pp. 70-76, 4 total pages).

Douglas Vincent de Jager, "Asynchronous Iterative Solution for Dominant Eigenvectors with Applications in Performance Modelling and PageRank", University of London Imperial College London Department of Computing. Mar. 2009, (cover 2pgs + Abstract pp. 2-3 + Acknowledgements pp. 3-4 + Contents pp. 5-8 + pp. 9-120, 122 total pages).

Douglas V. de Jager et al., "Extracting State-Based Performance Metrics using Asynchronous Iterative Techniques", Department of Computing, Imperial College London, (pp. 1-36, 36 total pages).

Simon Overell et al., "Classifying Tags using Open Content Resources", WSDM '09 Barcelona, Spain, 2009 ACM, ISBN: 978-1-60558-390-7, 2009, 10pgs.

\* cited by examiner

| | | | | | |
|---|---|---|---|---|---|
| ID=x | Time at which Webserver Request with ID=x is recorded in this Vector; 0 if not inserted into vector. | Time at which JavaScript Request with ID=x is recorded in this vector; 0 if not inserted into vector. | Time at which Image Request with ID=x is recorded in this vector; 0 if not inserted into vector. | Time at which setup message with ID=x is recorded in this vector; 0 if not inserted into vector. | Time at which first behavioural message with ID=x is recorded in this vector; 0 if not inserted into vector. |
| ID=y | Time at which Webserver Request with ID=y is recorded in this Vector; 0 if not inserted into vector. | Time at which JavaScript Request with ID=y is recorded in this vector; 0 if not inserted into vector. | Time at which Image Request with ID=y is recorded in this vector; 0 if not inserted into vector. | Time at which setup message with ID=y is recorded in this vector; 0 if not inserted into vector. | Time at which first behavioural message with ID=y is recorded in this vector; 0 if not inserted into vector. |
| ID=z | Time at which Webserver Request with ID=z is recorded in this Vector; 0 if not inserted into vector. | Time at which JavaScript Request with ID=z is recorded in this vector; 0 if not inserted into vector. | Time at which Image Request with ID=z is recorded in this vector; 0 if not inserted into vector. | Time at which setup message with ID=z is recorded in this vector; 0 if not inserted into vector. | Time at which first behavioural message with ID=z is recorded in this vector; 0 if not inserted into vector. |

EvidenceType

FIG. 2A

| TimeToBeClassified_x | TimeToBeClassified_z | TimeToBeClassified_y |
|---|---|---|
| ID=x | ID=z | ID=y |

| ID=A | Time at which Webserver Request with ID=A is recorded in this Vector; 0 if not inserted into vector. | Time at which JavaScript Request with ID=A is recorded in this vector; 0 if not inserted into vector. | Time at which Image Request with ID=A is recorded in this vector; 0 if not inserted into vector. | Time at which setup message with ID=A is recorded in this vector; 0 if not inserted into vector. | Time at which first behavioural message with ID=A is recorded in this vector; 0 if not inserted into vector. | Classification |
|---|---|---|---|---|---|---|
| ID=B | Time at which Webserver Request with ID=B is recorded in this Vector; 0 if not inserted into vector. | Time at which JavaScript Request with ID=B is recorded in this vector; 0 if not inserted into vector. | Time at which Image Request with ID=B is recorded in this vector; 0 if not inserted into vector. | Time at which setup message with ID=B is recorded in this vector; 0 if not inserted into vector. | Time at which first behavioural message with ID=B is recorded in this vector; 0 if not inserted into vector. | Classification |
| ID=C | Time at which Webserver Request with ID=C is recorded in this Vector; 0 if not inserted into vector. | Time at which JavaScript Request with ID=C is recorded in this vector; 0 if not inserted into vector. | Time at which Image Request with ID=C is recorded in this vector; 0 if not inserted into vector. | Time at which setup message with ID=C is recorded in this vector; 0 if not inserted into vector. | Time at which first behavioural message with ID=C is recorded in this vector; 0 if not inserted into vector. | Classification |

FIG. 2C

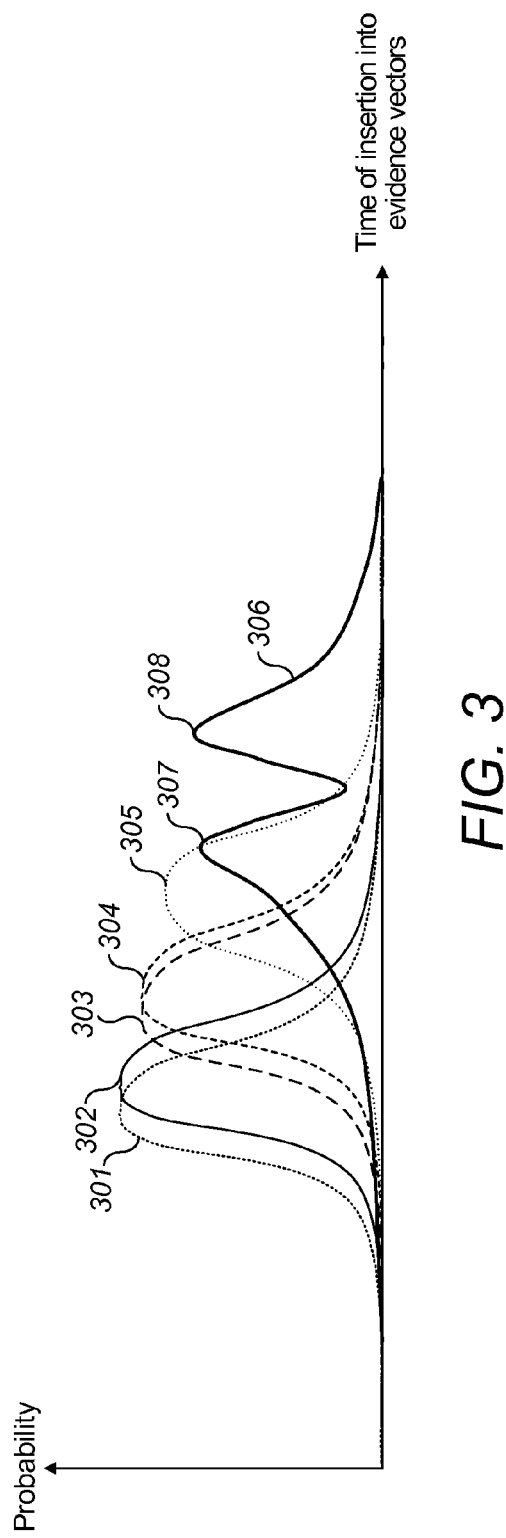

| Outcomes | Event Status | t=0 | t=0.5 | t=1 | t=1.5 | t=2 | t=2.5 | t=3 | t=3.5 | t=4 |
|---|---|---|---|---|---|---|---|---|---|---|
| Abnormal | 001 | 0.05 | 0.07 | 0.125 | 1 | 1 | 1 | 1 | 1 | 1 |
| Normal | 001 | 0.95 | 0.93 | 0.875 | 0 | 0 | 0 | 0 | 0 | 0 |
| Abnormal | 100 | 0.59 | 0.65 | 0.75 | 0.83 | 0.9 | 0.99 | 1 | 1 | 1 |
| Normal | 100 | 0.41 | 0.35 | 0.25 | 0.17 | 0.1 | 0.01 | 0 | 0 | 0 |
| Abnormal | 010 | 0.05 | 0.1 | 0.33 | 1 | 1 | 1 | 1 | 1 | 1 |
| Normal | 010 | 0.95 | 0.9 | 0.67 | 0 | 0 | 0 | 0 | 0 | 0 |
| Abnormal | 101 | | 0.02 | 0.024 | 0.03 | 0.04 | 0.05 | 0.1 | 0.33 | 1 |
| Normal | 101 | | 0.98 | 0.976 | 0.97 | 0.96 | 0.95 | 0.9 | 0.67 | 0 |
| Abnormal | 011 | | 0.01 | 0.53 | 1 | 1 | 1 | 1 | 1 | 1 |
| Normal | 011 | | 0.99 | 0.47 | 0 | 0 | 0 | 0 | 0 | 0 |
| Abnormal | 110 | | 0 | 0 | 0.01 | 0.02 | 0.04 | 0.09 | 0.29 | 1 |
| Normal | 110 | | 1 | 1 | 0.99 | 0.98 | 0.96 | 0.91 | 0.71 | 0 |
| Abnormal | 111 | | 0 | 0 | 0 | 0 | 0 | 0 | 0 | 0 |
| Normal | 111 | | 1 | 1 | 1 | 1 | 1 | 1 | 1 | 1 |

*FIG. 5*

| Outcomes | Event Status | t=0 | t=0.5 | t=1 | t=1.5 | t=2 | t=2.5 | t=3 | t=3.5 | t=4 |
|---|---|---|---|---|---|---|---|---|---|---|
| Abnormal | 001 | 0.05 | 0.07 | 0.125 | 1 | 1 | 1 | 1 | 1 | 1 |
| Normal | 001 | 0.95 | 0.93 | 0.875 | 0 | 0 | 0 | 0 | 0 | 0 |
| Abnormal | 100 | 0.59 | 0.65 | 0.75 | 0.83 | 0.9 | 0.99 | 1 | 1 | 1 |
| Normal | 100 | 0.41 | 0.35 | 0.25 | 0.17 | 0.1 | 0.01 | 0 | 0 | 0 |
| Abnormal | 010 | 0.05 | 0.1 | 0.33 | 1 | 1 | 1 | 1 | 1 | 1 |
| Normal | 010 | 0.95 | 0.9 | 0.67 | 0 | 0 | 0 | 0 | 0 | 0 |
| Abnormal | 101 | | 0.02 | 0.024 | 0.03 | 0.04 | 0.05 | 0.1 | 0.33 | 1 |
| Normal | 101 | | 0.98 | 0.976 | 0.97 | 0.96 | 0.95 | 0.9 | 0.67 | 0 |
| Abnormal | 011 | | 0.01 | 0.53 | 1 | 1 | 1 | 1 | 1 | 1 |
| Normal | 011 | | 0.99 | 0.47 | 0 | 0 | 0 | 0 | 0 | 0 |
| Abnormal | 110 | | 0 | 0 | 0.01 | 0.02 | 0.04 | 0.09 | 0.29 | 1 |
| Normal | 110 | | 1 | 1 | 0.99 | 0.98 | 0.96 | 0.91 | 0.71 | 0 |
| Abnormal | 111 | | 0 | 0 | 0 | 0 | 0 | 0 | 0 | 0 |
| Normal | 111 | | 1 | 1 | 1 | 1 | 1 | 1 | 1 | 1 |

*FIG. 6A*

| Outcomes | Event Status | t=0 | t=0.5 | t=1 | t=1.5 | t=2 | t=2.5 | t=3 | t=3.5 | t=4 |
|---|---|---|---|---|---|---|---|---|---|---|
| Abnormal | 001 | 0.05 | 0.07 | 0.125 | 1 | 1 | 1 | 1 | 1 | 1 |
| Normal | 001 | 0.95 | 0.93 | 0.875 | 0 | 0 | 0 | 0 | 0 | 0 |
| Abnormal | 100 | 0.59 | 0.65 | 0.75 | 0.83 | 0.9 | 0.99 | 1 | 1 | 1 |
| Normal | 100 | 0.41 | 0.35 | 0.25 | 0.17 | 0.1 | 0.01 | 0 | 0 | 0 |
| Abnormal | 010 | 0.05 | 0.1 | 0.33 | 1 | 1 | 1 | 1 | 1 | 1 |
| Normal | 010 | 0.95 | 0.9 | 0.67 | 0 | 0 | 0 | 0 | 0 | 0 |
| Abnormal | 101 | | 0.02 | 0.024 | 0.03 | 0.04 | 0.05 | 0.1 | 0.33 | 1 |
| Normal | 101 | | 0.98 | 0.976 | 0.97 | 0.96 | 0.95 | 0.9 | 0.67 | 0 |
| Abnormal | 011 | | 0.01 | 0.53 | 1 | 1 | 1 | 1 | 1 | 1 |
| Normal | 011 | | 0.99 | 0.47 | 0 | 0 | 0 | 0 | 0 | 0 |
| Abnormal | 110 | | 0 | 0 | 0.01 | 0.02 | 0.04 | 0.09 | 0.29 | 1 |
| Normal | 110 | | 1 | 1 | 0.99 | 0.98 | 0.96 | 0.91 | 0.71 | 0 |
| Abnormal | 111 | | 0 | 0 | 0 | 0 | 0 | 0 | 0 | 0 |
| Normal | 111 | | 1 | 1 | 1 | 1 | 1 | 1 | 1 | 1 |

FIG. 6B

| Outcomes | Event Status | t=0 | t=0.5 | t=1 | t=1.5 | t=2 | t=2.5 | t=3 | t=3.5 | t=4 |
|---|---|---|---|---|---|---|---|---|---|---|
| Abnormal | 001 | 0.05 | 0.07 | 0.125 | 1 | 1 | 1 | 1 | 1 | 0 |
| Normal | 001 | 0.95 | 0.93 | 0.875 | 0 | 0 | 0 | 0 | 0 | 1 |
| Abnormal | 100 | 0.59 | 0.65 | 0.75 | 0.83 | 0.9 | 0.99 | 1 | 1 | 0 |
| Normal | 100 | 0.41 | 0.35 | 0.25 | 0.17 | 0.1 | 0.01 | 0 | 0 | 1 |
| Abnormal | 010 | 0.05 | 0.1 | 0.33 | 1 | 1 | 1 | 1 | 1 | 0 |
| Normal | 010 | 0.95 | 0.9 | 0.67 | 0 | 0 | 0 | 0 | 0 | 1 |
| Abnormal | 101 |  | 0.02 | 0.024 | 0.03 | 0.04 | 0.05 | 0.1 | 0.33 | 1 |
| Normal | 101 |  | 0.98 | 0.976 | 0.97 | 0.96 | 0.95 | 0.9 | 0.67 | 0 |
| Abnormal | 011 |  | 0.01 | 0.53 | 1 | 1 | 1 | 1 | 1 | 0 |
| Normal | 011 |  | 0.99 | 0.47 | 0 | 0 | 0 | 0 | 0 | 1 |
| Abnormal | 110 |  | 1 | 0 | 0 | 0.02 | 0.04 | 0.09 | 0.29 | 1 |
| Normal | 110 |  | 0 | 1 | 0.99 | 0.98 | 0.96 | 0.91 | 0.71 | 0 |
| Abnormal | 111 |  | 1 | 0 | 0 | 0 | 0 | 0 | 0 | 0 |
| Normal | 111 |  | 1 | 1 | 1 | 1 | 1 | 1 | 1 | 1 |

*FIG. 6C*

| Outcomes | Event Status | t=0 | t=0.5 | t=1 | t=1.5 | t=2 | t=2.5 | t=3 | t=3.5 | t=4 |
|---|---|---|---|---|---|---|---|---|---|---|
| Abnormal | 001 | 0.05 | 0.07 | 0.125 | 1 | 1 | 1 | 1 | 1 | 1 |
| Normal | 001 | 0.95 | 0.93 | 0.875 | 0 | 0 | 0 | 0 | 0 | 0 |
| Abnormal | 100 | 0.59 | 0.65 | 0.75 | 0.83 | 0.9 | 0.99 | 1 | 1 | 1 |
| Normal | 100 | 0.41 | 0.35 | 0.25 | 0.17 | 0.1 | 0.01 | 0 | 0 | 0 |
| Abnormal | 010 | 0.05 | 0.1 | 0.33 | 1 | 1 | 1 | 1 | 1 | 1 |
| Normal | 010 | 0.95 | 0.9 | 0.67 | 0 | 0 | 0 | 0 | 0 | 0 |
| Abnormal | 101 | | 0.02 | 0.024 | 0.03 | 0.04 | 0.05 | 0.1 | 0.33 | 1 |
| Normal | 101 | | 0.98 | 0.976 | 0.97 | 0.96 | 0.95 | 0.9 | 0.67 | 0 |
| Abnormal | 011 | | 0.01 | 0.53 | 1 | 1 | 1 | 1 | 1 | 1 |
| Normal | 011 | | 0.99 | 0.47 | 0 | 0 | 0 | 0 | 0 | 0 |
| Abnormal | 110 | | 0 | 0 | 0.01 | 0.02 | 0.04 | 0.09 | 0.29 | 1 |
| Normal | 110 | | 1 | 1 | 0.99 | 0.98 | 0.96 | 0.91 | 0.71 | 0 |
| Abnormal | 111 | | 0 | 0 | 0 | 0 | 0 | 0 | 0 | 0 |
| Normal | 111 | | 1 | 1 | 1 | 1 | 1 | 1 | 1 | 1 |

*FIG. 6D*

| Outcomes | Event Status | t=0 | t=0.5 | t=1 | t=1.5 | t=2 | t=2.5 | t=3 | t=3.5 | t=4 |
|---|---|---|---|---|---|---|---|---|---|---|
| Abnormal | 001 | 0.05 | 0.07 | 0.125 | 1 | 1 | 0 | 1 | 1 | 1 |
| Normal | 001 | 0.95 | 0.93 | 0.875 | 0 | 0 | 0.99 | 0 | 0 | 0 |
| Abnormal | 100 | 0.59 | 0.65 | 0.75 | 0.83 | 0.9 | 0.99 | 1 | 1 | 1 |
| Normal | 100 | 0.41 | 0.35 | 0.25 | 0.17 | 0.1 | 0.01 | 0 | 0 | 0 |
| Abnormal | 010 | 0.05 | 0.1 | 0.33 | 0 | 0 | 1 | 1 | 1 | 1 |
| Normal | 010 | 0.95 | 0.9 | 0.67 | 1 | 1 | 0 | 0 | 0 | 0 |
| Abnormal | 101 |  | 0.02 | 0.024 | 0.03 | 0.04 | 0.05 | 0.1 | 0.33 | 1 |
| Normal | 101 |  | 0.98 | 0.976 | 0.97 | 0.96 | 0.95 | 0.9 | 0.67 | 0 |
| Abnormal | 011 |  | 0.01 | 0.53 | 1 | 1 | 1 | 1 | 1 | 1 |
| Normal | 011 |  | 0.99 | 0.47 | 0 | 0 | 0 | 0 | 0 | 0 |
| Abnormal | 110 |  | 0 | 0 | 0.01 | 0.02 | 0.04 | 0.09 | 0.29 | 1 |
| Normal | 110 |  | 1 | 1 | 0.99 | 0.98 | 0.96 | 0.91 | 0.71 | 0 |
| Abnormal | 111 |  | 0 | 0 | 0 | 0 | 0 | 0 | 0 | 0 |
| Normal | 111 |  | 1 | 1 | 1 | 1 | 1 | 1 | 1 | 1 |

*FIG. 6E*

FAST DEVICE CLASSIFICATION

FIELD OF THE INVENTION

The present invention relates to the classification of client devices accessing content provided by a server. In particular, but not exclusively, the present invention relates to the classification of a client device accessing content stored on the server over a network so as to identify occasions on which the client device is not under the control of a legitimate user.

BACKGROUND TO THE INVENTION

One of the great advantages of the internet is its open architecture, which allows connections to be formed between nodes in the network that have no previous relationship. In this way, for example, a retailer may provide a web site that is accessible to all potential customers globally, without first having to subject the customer to any verification process or establish any physical connection.

The openness of the internet, however, inevitably provides opportunities for malicious agents to conceal their true nature in order to subvert the legitimate use of web resources. Where this relates to the efforts by unauthorised parties to gain access to sensitive information, it is well known to hide that information behind passwords and other security measures. However, there are circumstances in which providers do not wish to conceal information or functionality from the public in general, but only wish to stop misuse.

For example, one technique for monetising user traffic on the internet is CPM (cost per thousand impressions) display advertising. In this arrangement, an advertiser's display advertisement is placed in a web page, and each time that page is requested to be viewed by a visitor a fee is paid to the website owner. As such, the more times the web page comprising a display advertisement is requested to be viewed, the greater the fee that is paid to the website owner.

The premise of the CPM advertising model is that each webpage request is legitimately that of a potential customer of the advertiser. The model breaks down if the requests for webpages comprising display advertisements are carried out with any other purpose. Nevertheless, there may be an incentive for the website owner, or indeed the advertiser's competitors, to perform requests for the purpose of causing the advertiser to pay a fee. Requesting an advertiser's advertisements for this purpose is known as "impression fraud".

The most common manner in which impression fraud is carried out is by the use of automated programs, often called online robots or "bots". These bots are malicious agents designed to automatically carry out tasks, such as requesting webpages comprising advertisers' display advertisements, so as to frustrate the intended purpose of the CPM advertising system.

Bots are also used to carry out a number of other malicious activities. For example, bots can be used to overwhelm web sites which provide information to legitimate users by submitting excessive requests. In other circumstances, bots have been used to inject marketing spam into comment sections of web pages. Bots have also been used for content gathering, such as content theft for unauthorised republication or content retrieval for competitive intelligence (for example, retrieving information such as product lists, client lists, pricing details and so on).

A notable feature of bots is that they are not tied to particular devices, and may therefore operate from a variety of sources. For example, while a bot may operate on a device owned by the bot owner, it may also operate on machines rented by the bot owner or even on the machines of legitimate users who are unaware of the bot's presence. In this latter example, the bot may spread to legitimate users' devices in the manner of a computer virus. This variety of sources for bot activities adds to the difficulty in detecting and isolating them, and can provide direct inconvenience to legitimate users who may find their device operating sub-optimally due to the presence of a bot.

In order to counter the problems associated with bots, they must first be identified. There is therefore a need to distinguish between the activities of bots and those of legitimate users in a reliable way.

United States Patent Application US20070255821 proposes three techniques for identifying bots, particularly in the context of click fraud. According to this document, one approach is to check at the end of each 24-hours period whether the number of occurrences of a particular logged parameter—for example, the IP reported in an HTTP header—associated with a resource request over the 24-hour period exceeds some threshold. A second approach is to pick out at the end of each 24-hour period those resource requests for which no client-side events (e.g. a JavaScript-tracked mouse movement) have been logged. A third approach is to check whether particular parameters associated with a resource request—IP, referrer URL and User Agent—may be found in a database of previously detected fraudulent requests (where this database is updated once every 24 hours using the previous two methods).

Although the techniques described in US 2007/0255821 and others like it have some efficacy, they are unable to provide accurate classifications of client devices at sufficient speed. For example, the first two approaches described in US 2007/0255821 only make classifications at the end of each 24 hour period, meaning that up until this point a bot may continue its activities unhindered. On the other hand, if the period described in US 2007/0255821 were reduced, this would reduce the accuracy of the classification.

SUMMARY OF THE INVENTION

According to a first aspect of the present invention, there is provided a method for classifying a client requesting content from a server, comprising:
  monitoring a plurality of different events associated with the client device requesting content from the server;
  storing an evidence vector comprising information identifying the events that have occurred;
  determining a classification time in dependence on the evidence vector; and
  processing, when the classification time has been reached, the evidence vector to determine a classification for the client device,
  wherein the classification is indicative of a type of agent controlling the client device and the classification time is a time at which the classification may be determined with a predetermined level of confidence.

By calculating a classification time at which a predetermined degree of confidence can be established in determining a classification for a client device, based on the events associated with a content request, the present invention can assist in minimising the time necessary to carry out a reliable classification based on these events. For example, the present invention can be used to assess, in the fastest time possible to ensure a known degree of confidence, whether the agent controlling the client device is likely to be a bot, or other malicious entity.

Rather than simply summing particular event parameters over a fixed period of time, the present invention models the time at which the different events associated with a single resource request would be expected to take place and to be logged and to be recorded in an evidence vector. This approach contrasts with prior art techniques which take no account of the fact that the events associated with a particular resource request may not be recorded at the same time.

The present invention also takes account of the fact that the order and timing of the associated events being recorded may vary greatly across resource requests. For example, for some particular resource request, we may find that the corresponding web-server log is queued at the web server for over thirty minutes before it is sent to the classification server for insertion into the evidence vector (potentially because the web server is under high load at the time, and so the outgoing log messages are held in a queue). In such a case, if the client-side events, like those relating to mouse movements or key strokes, by-pass the said queue, then these client-side events would be recorded in the associated evidence vector a long time before the server-side event is recorded in the evidence vector. By contrast, for some other resource request, the resource may be requested in a background tab at the client. In such a case, some client-side behaviour (a mouse movement, for example) would not be recorded until the background tab is opened in the foreground. By determining a classification at an appropriate classification time, which captures these types of eventuality, the present invention avoids the danger that client devices are mischaracterised because classification takes place before some of the associated events have been recorded.

Typical events associated with a content request include, but are not limited to: the web server sending a web-server log; the client requesting a JavaScript file; the client requesting an XHR/JSONP file; the client requesting an image pixel; the web server sending a log entry for a CSS request; the client requesting an iframe; the client sending the output of some JavaScript executable where this output is indicative of JavaScript quirks typical of the claimed User Agent; the client sending several behavioural messages relating to mouse movements and keystrokes.

The predetermined level of confidence may take a range of appropriate values. For example, the predetermined level of confidence may be 98% or 99%. In other examples, the predetermined level of confidence may take other values, such as 70%, 90% or 95%. The predetermined level of confidence may be user defined, and/or may be calculated in dependence on the identities of one or both of the client device and the server.

As described above, the present invention helps to ensure that classification occurs at the earliest time for which a predetermined level of confidence in the classification can be achieved. However, in some cases, it is preferred to receive a classification as soon as possible, even if the predetermined level of confidence cannot yet be achieved. Accordingly, in some preferred embodiments, the method may comprise determining a provisional classification of the client device in dependence on the evidence vector, wherein the step of determining a provisional classification occurs prior to the classification time. The provisional classification may include an indication of the level of confidence with which the classification has been made, to allow subsequent decisions (such as regulating the client device's access) to be taken in dependence on this information.

In preferred embodiments, the evidence vector further comprises information regarding the order in which the events occurred.

By using information relating to the order in which different events were stored, a more accurate classification time can be established. The order may also be considered when assessing the nature of the agent controlling the device, potentially leading to further advances in the reliability of the classification. For example, the order in which certain events take place when a resource is requested may be determined by the quirks of the particular browser, and so this information may be used to classify the client device.

Preferably, the evidence vector further comprises information regarding the times at which the events occurred. This may provide further information to allow the determination of even more accurate classification times. Moreover, the classifications themselves may be more accurate because they take into account such information.

The information regarding the order or timing of events may be derived from the time at which details of the event are received. For example, if a classification server is employed to carry out the method, the order and timing of the events may be taken to be the order and timing at which details of these events are received at the classification server. Alternatively the information regarding the order or timing of events may be derived from the time at which the details of the event are recorded in the appropriate evidence vector. In another arrangement, the information regarding either the order or timing of the events may be derived from another source, such as from a time stamp applied by one or both of the client device and the server. Yet another arrangement may include multiple timestamps per event—for example, a timestamp produced by a client device or web server, a timestamp which marks receipt by a classification server and a timestamp which marks insertion into an evidence vector.

In preferred embodiments, the step of processing the evidence vector comprises comparing the evidence vector with one or more probability distribution functions representing typical behaviour of client devices under the control of one or more types of agent. By comparing the evidence vector, which includes information relating to the activity of the client device in the particular case, with information relating to the typical behaviour of a client device under the control of a particular agent type, the present invention can assist in determining the likely agent type which is controlling the client device in this particular case, and thus in determining the correct classification for the client device. Agent types in this context may include legitimate users, bots or different types of bots, and malicious human users, for example. The probability distribution functions may be generated in a variety of ways. These include, but are not restricted to, learning with decision trees, learning a lookup table from ground truth and empirically testing hand-crafted rules.

Preferred embodiments of the present invention further comprise the steps of: carrying out ancillary analysis of at least one of the events that has occurred; and storing results of the analysis in the evidence vector. In this way, further information relevant to the classification of the client device can be provided in the evidence vector. For example, the event might be a mouse movement, or other information regarding an input of the client device, and close analysis of this might indicate a distinction between a device under the control of a human user with legitimate intent and a malicious human user (for example, a human impression fraudster). This evidence can be incorporated in the evidence vector, allowing the classification time and the classification itself to take it into due account. Alternatively, individual analysis of the events may be carried out without adding the results to the evidence vector; in this case, the results of the individual analysis may be applied in some other way (for example, after the classification has been completed, as a form of second-stage classification).

Preferably, the classification time is determined repeatedly up until the evidence vector is processed. The classification time is determined in dependence on the evidence vector, which in turn stores events that have occurred. Therefore, as further events occur and are stored in the evidence vector, it may be appropriate to update the classification time. For example, the classification time may be determined at regular intervals up until the evidence vector is processed, or may be determined each time a change is made to the evidence vector. However implemented, repeated determination of the classification time helps to ensure that it is accurately determined using the latest available information.

Preferably, the method further comprises the step of assigning an interaction ID to the web resource request, wherein events associated with this resource request are stored in the evidence vector associated with this interaction ID. The interaction ID can be used to keep track of the events that are related to a particular resource request, allowing a system to be developed which simultaneously monitors and classifies the requests from a plurality of client devices from a plurality of web servers. The interaction ID assists in maintaining a record of the different events that occur when a particular client device requests a resource from a particular web server, and thereby assists in analysing this request to classify the client device.

Preferably, the method further comprises controlling the access of the client to the server in dependence on the classification of the client device. For example, the activities of client devices which are classified as being controlled by malicious entities such as bots may be curtailed, while those of clients classified as being controlled by legitimate users may proceed unimpeded.

Examples of the classifications that may be given to client devices include: human user; automaton; user to be blocked; user to be throttled; user to be sent to the sand box; and user to be monitored. Different classifications may indicate to the server that differing levels of access should be afforded to the client device.

According to a second aspect of the present invention, there is provided an apparatus for classifying a client device requesting content from a server, the apparatus being arranged to:

monitor a plurality of different events associated with the client device requesting content from the server;
store an evidence vector comprising information identifying the events that have occurred;
determine a classification time in dependence on the evidence vector; and
process, when the classification time has been reached, the evidence vector to determine a classification for the client device,
wherein the classification is indicative of a type of agent controlling the client device and the classification time is a time at which the classification may be determined with a predetermined level of confidence.

It can also be appreciated that the invention can be implemented using computer program code. Indeed, according to a further aspect of the present invention, there is therefore provided a computer program product comprising computer executable instructions for carrying out the method of the first aspect. The computer program product may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

BRIEF DESCRIPTION OF THE DRAWINGS

Embodiments of the present invention will now be described, by way of example only, with reference to the accompanying drawings, in which:

FIG. 2A schematically illustrates an evidence vector for recording events during interactions between client devices and web servers;

FIG. 2B schematically illustrates an evaluation time vector for recording the time at which interactions between client devices and web servers can be classified;

FIG. 2C schematically illustrates a classification vector for storing completed client device classifications;

FIG. 3 shows exemplary probabilities distributions for events that may occur in an interaction between a client device and a web server;

FIG. 5 illustrates a look-up table for use in classifying a client device and determining a classification time;

FIGS. 6A to 6E highlight information in the look-up table of FIG. 5 that is used during an exemplary interaction.

DETAILED DESCRIPTION

Figure 1:
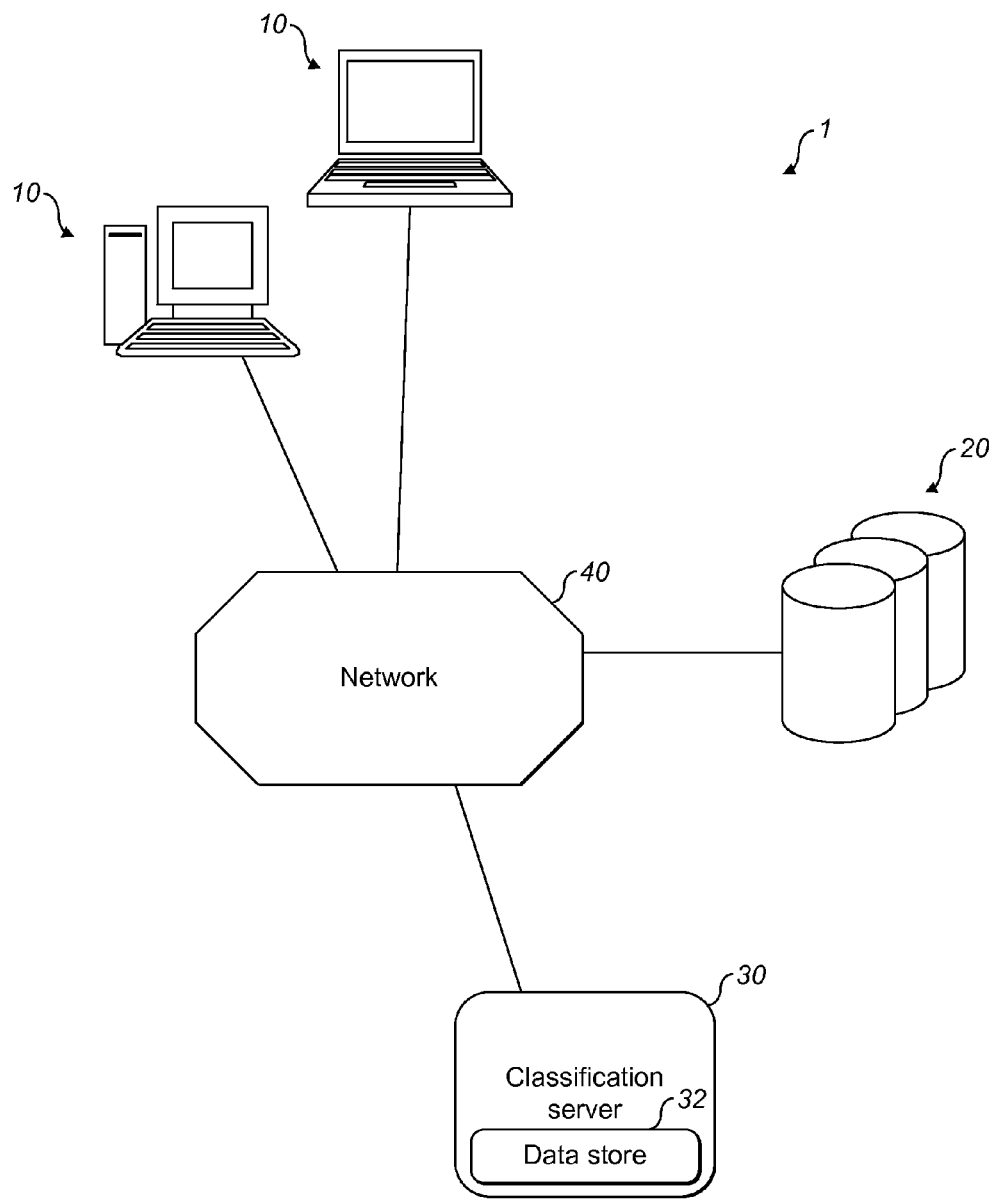
FIG. 1 shows a content delivery system for use in conjunction with a preferred embodiment of the present invention.

FIG. 1 illustrates a content delivery system 1 that can be used in accordance with a first preferred embodiment of the present invention. The content delivery system 1 comprises a plurality of client devices 10, a plurality of web servers 20, a classification server 30, and a network 40. The network 40 connects the client devices 10, web servers 20 and the classification server 30 to each other. In the preferred embodiment, the network 40 is the internet.

The client devices 10 are not limited by form factor and may have various capabilities. Client devices 10 that may be used in accordance with the present invention include personal computers (PCs), mobile phones, games consoles, tablet devices and internet-enabled televisions. In most examples, the client devices will include a user interface for receiving user inputs. The user interface may take the form of a keyboard, remote control, pointing device, touchscreen or any other interface as appropriate. Furthermore, the client devices 10 typically comprise a display which can be used to display images to the user.

As will be explored in greater detail below, in some cases the client devices 10 are not operated by their legitimate users, but are under the control of a bot or other piece of malware. As such, in the following description, the entity controlling the actions of the client device 10 will be referred to as an agent. One of the purposes of the system 1 is to identify the type of agent controlling a given client device 10; for example, to classify whether the agent is a legitimate human user or a bot. This is done on the basis of the client device's 10 behaviour.

The web servers 20 and the classification server 30 may be conventional computing devices for use as network servers.

Alternatively, they may be implemented on other forms of network-enabled device not specifically designed as a server, such as a conventional personal computer. In general, the use of the terms client and server in this description is indicative of the functions performed by elements of the system but is not limiting as to the hardware employed. Moreover, it will be appreciated that web servers 20 are used in the context of the network 40 being the internet, but in other context different types of servers may be employed for this task.

The network 40 allows communication between the client devices 10 and the web servers 20, and in particular allows content to be downloaded from the web servers 20 to the client devices 10. For example, a web page may be hosted by a web server 20 and this may be requested across the network 40 by a client device 10 in a manner consistent with conventional internet usage. The web page so downloaded may contain links or other interactive elements causing ongoing communications between the client device 10 and the web server 20.

The classification server 30 comprises a data store 32 for storing various data relevant to the classification of a client device 10. FIGS. 2A, 2B and 2C illustrate some of the content of the data store 32. FIGS. 2A, 2B and 2C illustrate this content in the form of tables containing the relevant data used by the system 1.

In particular, FIG. 2A shows an evidence vector 34. In the evidence vector 34 are stored the times at which various events associated with an interaction between a client device 10 and a web server 20 occur. These events are stored against an interaction ID which is specific to each individual interaction between a client device 10 and a web server 20. As such, the evidence vector 34 can simultaneously and distinctly contain data relating to events that are associated with multiple different interactions between various client devices 10 and web servers 20. In the table format shown in FIG. 2A, each column represents a different event, while each row represents a different interaction ID. When events occur for a particular interaction ID, the relevant location in the table is updated to reflect this.

As will be described in greater detail below, the classification server 30 is arranged to make a final classification of a particular client device 10 interacting with a web server 20 at a classification time, which may depend on events so far recorded in the evidence vector 34 for that interaction. The classification time is stored in an evaluation time vector 36, which is illustrated in FIG. 2B. The evaluation time vector 36 shows a time to be classified for each pending interaction between a client device 10 and a web server 20. Each of the times to be classified are stored against the interaction ID for the relevant interaction.

FIG. 2C shows classification vectors 38 that are stored for each completed classification. Each classification vector 38 includes the interaction ID to which they relate, the list of events and times at which they occurred that were stored in the evidence vector 34 during the interaction, and the result of the final classification.

The classification server 30 monitors events that occur while the client devices 10 access the web server 20 to classify the nature of the client devices 10. Events that are associated with an interaction may include, but are not limited to, the generation of a web server log, a JavaScript request, an eXtended Mark-up Language HyperText Transfer Protocol Request (XHR)/JavaScript Object Notation with Padding (JSONP) request, an image request, a Cascading Style Sheet (CSS) request, and behavioural messages relating to mouse movements and keystrokes. A record of the events that are associated with the interaction are stored, together with the order and timing in which they occur. By comparing this record against probabilistic models of expected inter-event times the classification server can determine, and keep updating, a classification time, that is a time at which a classification can be made with a pre-determined level of confidence. After the classification time the classification server can classify the client device 10. This is done, for example, by determining whether the events that have been recorded for a given interaction ID, and the order in which the events occur, match the typical behaviour of a human or legitimate user or whether the events and the order in which the events occur more closely matches the typical behaviour of a piece of malware or a bot.

FIG. 3 shows an exemplary probability distribution for the timings of certain events when a web page is accessed by a client device 10 under the control of a legitimate user. In particular, FIG. 3 shows the time distribution for an image pixel request 301, a JavaScript request 302, a setup message 303, an error message 304, a webserver log 305, and a first behavioural message 306 such as a keystroke or mouse movement. In this example, the setup message 303 is a message sent by the web browser operating at the client device 10 immediately after the web page is loaded. The setup message may be an XHR/JSONP message containing details about the browser operating on the client device 10.

The setup message 303 can be generated using a script operating at the client device 10 which is designed for this purpose. For example, JavaScript in the web page may generate the setup message 303 when executed at the client device 10. Moreover, the setup message may provide information regarding the client device 10. For example, it may be appreciated that different browser types may produce different setup messages 303 (in some cases, because different browser types execute JavaScript in different ways). As such, the setup message 303 may be analysed in itself to provide information that can be used in the classification of the client device 10. For example, if the client device 10 has indicated that it is operating the Firefox web browser, but the setup message is inconsistent with the use of this type of web browser, this may suggest that the client device 10 is under the control of a malicious agent, such as a bot.

In the particular example shown in FIG. 3, there are two probability peaks for the first behavioural message 306. The first probability peak 307 relates to the likely time of a behavioural message for users who immediately view a requested page, while the second probability peak 308 relates to the time at which a behavioural message might be expected for users who open the web page in a background tab. The skilled person will appreciate that in practice, the probability distributions may vary significantly between web pages, and indeed according to the nature and connection of the client device 10 and server 20. Nevertheless, FIG. 3 illustrates some of the factors that may be relevant for a given sequence of events.

A variety of classifications may be applied to the client device 10 in dependence on events stored in the evidence vector 34. Potential classifications include "Human User", "Automaton", "User to be Blocked", "User to be Throttled", "User to be Sent to the Sand Box", "User to be Monitored", "Impression Fraudster", "Click Fraudster" and "User to be Excluded from Billing Engine". As the skilled person will recognise, not all classifications correspond to a particular agent type in control of the client device 10, but may instead correspond to varying degrees of confidence as to the type of agent operating the client device 10.

For example, "User to be Monitored" might indicate that the activities of the client device 10 are suggestive of a bot, but do not indicate a motive for that bot. To limit its impact, the access of the client device 10 to the web server 20 when this classification is made may be limited, such as to one request every six seconds. The access may be limited to the access that one would expect to be required by a legitimate user.

On the other hand, "User to be Blocked" may indicate that it is certain that the client device 10 is under the control of a bot. The client device 10 may then be blocked from accessing the web server 20 for a period of time, such as 24 hours.

Similarly, other classifications such as "User to be Sent to the Send Box" or "User to be Throttled" may indicate the type of content to which the client device 10 is provided access or the rate at which access is provided, again in dependence on the likely type of agent operating the client device 10. Another example of controlling the level or type of access available might be "User to be Excluded from Billing Machine".

Classifications such as "Impression Fraudster" or "Click Fraudster" can give an indication not just that the agent controlling the client device 10 is malicious, but also what type of malicious activity is being undertaken.

Once a client device 10 has been classified, the access of the client device 10 to the web server 20 can be controlled in dependence on the classification of the client device. For example, this control may be effected by providing the classification to the web server 20, which then acts to regulate access of the client device 10 to the web server accordingly. In some embodiments, where access to the web server 20 is regulated, a message may be provided to the client device 10 explaining that this is so, and the reasons why. The message may include information as to how the client device 10 may demonstrate that it is under the control of a legitimate user, or may even include interactive elements designed to test the nature of the agent controlling the client device 10.

Figure 4:
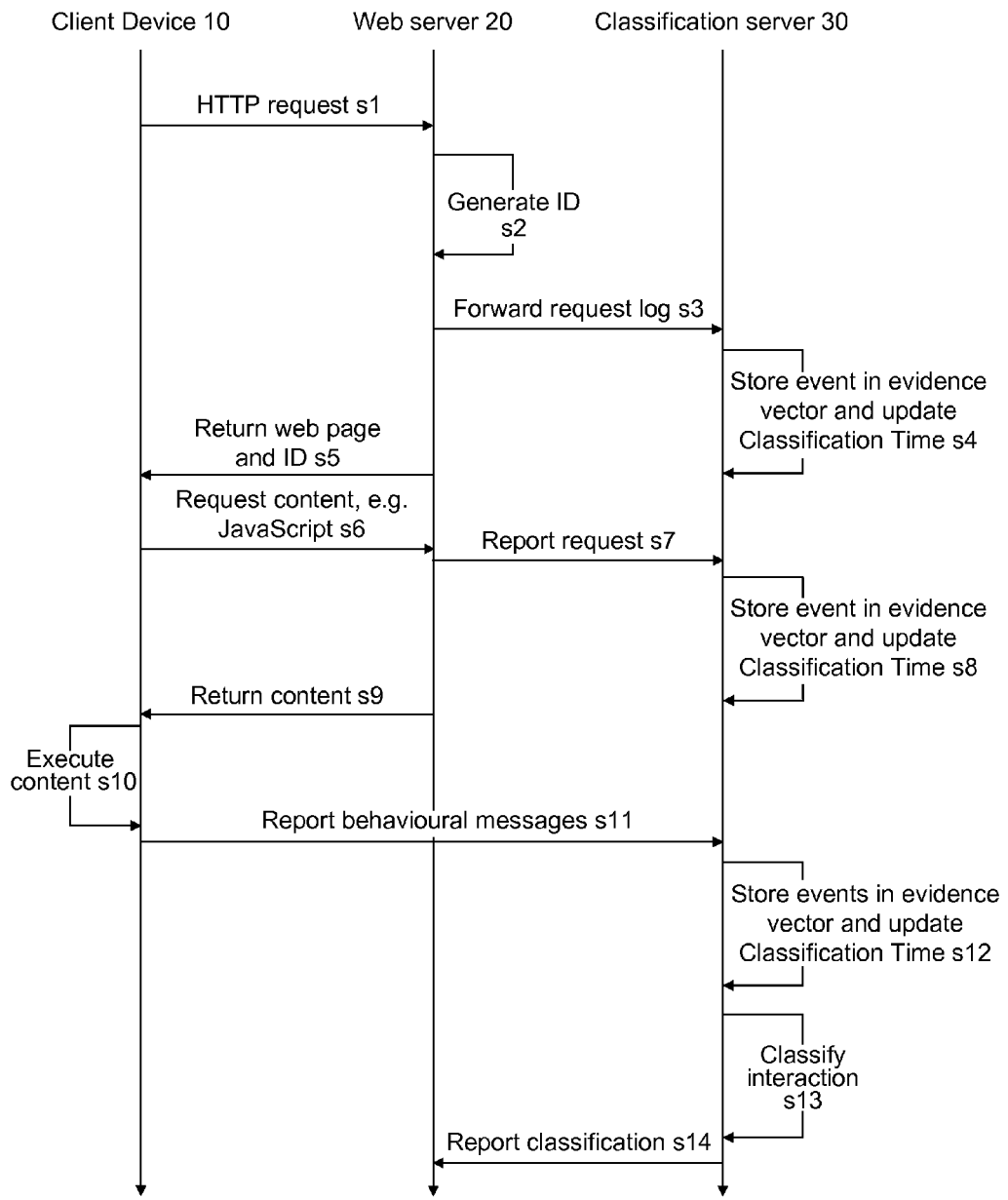
FIG. 4 illustrates the operation of the content delivery system during an exemplary interaction between a client device and a web server.

FIG. 4 illustrates the principle steps associated with a typical interaction of a client device 10 and a web server 20. The skilled person will appreciate that alternative or additional steps may occur in some circumstances, and that the order of the steps illustrated in FIG. 4 may vary. For example, these factors may vary according to the nature of the client device 10 or the type of content requested from the web server 20.

Moreover, the skilled person will appreciate that FIG. 4 provides only an example of the manner in which communications between the entities involved in the system may be effected. For example, in the example of FIG. 4, the classification server 30 receives communications directed towards it from the client device 10 and the web server 20. However, in other embodiments, the classification may act via a network wiretap or sniffer, intercepting communications between the client device 10 and the web server 20 and extracting the necessary information.

In the example shown in FIG. 4, the client device 10 accesses the internet via an internet browser, as known in the art. At step s1, the internet browser navigates to a web page hosted by the web server 20, causing a HyperText Transfer Protocol (HTTP) request to be sent to that web server 20.

At step s2, the web server 20 generates an interaction ID. As described below, the interaction ID is used to identify events relating to a specific interaction. In particular, the interaction ID is used to store events relating to this interaction between the client device 10 and the web server 20, and to distinguish those events from events which may be received from other interactions between other client devices 10 and web servers 20 (not shown in FIG. 4).

At step s3, the web server 20 reports the HTTP request to the classification server 30 in a request log. The web server also provides the interaction ID to the classification server 30 at this stage. The request log may include such details as the uniform resource locator (URL) of the requested web page, the internet protocol (IP) address of the client device 10 from which the HTTP request originated, the time at which the HTTP request was received, and other identifying details relating to the HTTP request; these details include but are not limited to fields typically found in a server log or passed as part of an HTTP request header. Although in this example, the request log is provided as a single entity, it will be appreciated that a number of request logs may be generated, for example, holding different types of information.

On receiving the interaction ID and the request log, the classification server generates a new entry in the evidence vector 34, at step s4. For example, the classification server 30 stores an indication that for the generated interaction ID an HTTP request has occurred and the time at which that request occurred. In particular, the classification server 30 stores an indication of the time of the HTTP request associated with the interaction ID in the evidence vector 34.

Moreover, in addition to generating a new entry on the evidence vector, at step s4 the classification server also determines a Classification Time. For example, having received the request log, the classification server uses probabilistic models to determine a time at which the likelihood of having received other events relevant to classification would exceed a given level of confidence.

At step s5, the web server 20 returns the requested web page to the client device 10 in the usual way. Moreover, the web server 20 returns the interaction ID to the client device 10. From this point on, the client device 20 may interact with the web page as usual. However, actions taken by the client device 10 are tagged using the interaction ID to allow these to be recognised and subsequent events to be stored in the evidence vector 34.

Certain types of interaction between the client device 10 and the web server 20 may be more indicative of a bot controlling the client device 10 than a legitimate user. For example, when a legitimate user controls the client device 10, it is likely that images in the web page will be requested, whereas many types of bots will not request images. Similarly, it may be more likely that legitimate user will request code embedded in the web page, such as JavaScript applications.

In the example shown in FIG. 4, at step s6 the client device 10 requests a JavaScript application from the web server 20. The web server 20 reports this request to the classification server 30, at step s7. The classification server 30 then records the request as an event in the evidence vector 34, at step s8. Again, the event is stored in the evidence vector 34 with an indication of the time at which the event occurred. The event is stored against the interaction ID for this particular interaction between the client device 10 and the web server 20.

In addition, at step s8, using the evidence vector 34 with the newly added event, the Classification Time is updated by the classification server 30.

In this example, the client device 10 has requested a JavaScript application, and this is returned to the client device 10 from the web server 20 at step s9. The client device 10 executes the JavaScript application at step s10.

During execution of the JavaScript application, various behavioural events may occur as the agent controlling the client device 10 interacts with the application. For example, these behavioural events may include mouse movements, keyboard inputs and so on. In the example shown in FIG. 4, these behavioural events are reported directly from the client device 10 to the classification server 30 through code enacted in the JavaScript application at step s10. On receiving information regarding the behavioural events, at step s12 the classification server 30 stores these in the evidence vector 34, together with the time at which they occurred, against the interaction ID.

Moreover, at step s12, using the evidence vector 34 with the newly added event, the Classification Time is updated by the classification server 30.

Although not illustrated in FIG. 4, there may be some ancillary analysis carried out of the events that have occurred during the interaction. Typically, the ancillary analysis will be carried out by the classification server 30, although it may be carried out by other elements of the system. Ancillary analysis comprises analysing the details of individual events to identify whether they are indicative of a particular type of agent controlling the client device 10. For example, a bot may simulate one of the behavioural events described above, in order to disguise itself as a legitimate user. This may be effective in convincing the classification server that such an event has taken place, but close analysis of the event itself may identify differences between the simulated behavioural event and what one would expect from a legitimate user. For example, if the behavioural message is a mouse movement, the ancillary analysis may analyse this to identify whether the particular movement is likely to be that of a legitimate user, or may alternatively be indicative of a bot. The output of such ancillary analysis may be Boolean or probabilistic in nature and will be taken into account when processing the evidence vector.

The results of the ancillary analysis may be stored in the evidence vector 34. However, in other embodiments the results of the ancillary analysis may be stored elsewhere and incorporated into the classification of the client device 10 after the evidence vector 34 is processed.

As mentioned above, each time events are recorded in the evidence vector 34, the Classification Time is generated or updated (see steps s4, s8 and s12). The Classification Time represents the time at which, given the events stored in the evidence vector, a classification can be made with a predetermined level of confidence. The Classification Time therefore represents the point at which final classification is to be carried out, in the absence of any further events.

Accordingly, when the Classification Time is reached, the classification server 30 classifies the client device 10, at step s13. This classification is carried out by processing the events stored in the evidence vector 34, together with the indication of the order in which and time at which these events occurred. This information can be compared to the likely behaviour of certain types of client device 10 in order to deduce the most likely nature of the client device 10 and thereby classify it. For example, if the events carried out during the interaction match most closely to the likely behaviour of a bot rather than a legitimate user, the client device 10 will be classified as such.

At step s14, the classification is returned to the web server 20. The web server 20 can then use the classification to regulate the client device's 10 access to the content on the web server 20.

In some cases, particularly when providing a provisional classification, the classification server 30 may provide the web server with an indication of the probabilities for various types of agent operating the client device 10. For example, the classification server 30 might indicate that the agent operating the client device 10 is 75% likely to be a legitimate user, but 25% likely to be a bot. The web server 20 may apply a threshold to these probabilities in order to regulate the client device's 10 access. For example, if information stored on the web server 20 is sensitive, the web server 20 may require 90% certainty that the client device 10 is a legitimate user, while if the information is less sensitive the server 20 may only require 70% certainty that the client device 10 is a legitimate user.

The step of classification s13 may occur at various points in time. In preferred embodiments, a distinction is made between a provisional classification and a final classification. A final classification occurs at the classification time stated for a particular interaction ID in the evaluation time vector 36. This classification "consumes" data from the evidence vector 34, in that once a final classification has taken place for a given interaction ID, the event data for that ID is moved from the evidence vector 34 to the classification vector 38. At this point, the classification server 30 also stops observing events occurring during the interaction between the client device 10 and the web server 20 which corresponds with the interaction ID.

As mentioned above, the classification server 30 may also carry out provisional classifications. When a provisional classification is carried out, the data in the evidence vector is not consumed, and the classification server 30 does not cease monitoring the interaction between the client device 10 and the web server 20. A provisional classification may be carried out at any time and any number of times, and may be driven by a requirement for the web server 20 to identify the client device 10 immediately. For example, the client device 10 may request sensitive content from the web server 20. At this point, it is no longer appropriate for the classification server 30 to wait until a predetermined likelihood is reached to classify the client device 10, but instead the classification server should return the most likely result immediately.

The manner in which provisional classifications, final classifications, and the classification time are calculated can be understood with reference to FIG. 5, which shows a lookup table in simplified scenario in which only three types of events occur. In FIG. 5, an event having occurred is indicated by a "1", while an event that has not occurred is indicated by a "0". For three different event types, there are seven possible combinations, given that at least one event has occurred for the record to be produced in the evidence vector. These seven combinations are represented in the column marked "Event Status" in FIG. 5. The event status is represented by a three character binary code representing whether each of the events has taken place.

In the simplified example of FIG. 5, there are two possible classifications, "normal" and "abnormal". These are indicated in the column marked "Outcomes". Accordingly, FIG. 5 includes a row for each possible combination of events and outcomes.

The remaining columns of FIG. 5 show the level of confidence with which each classification can be given for a given combination of events at a given time since the first event. As such, each column is headed by the time (t=0, t=0.5 etc.) to which it relates. In this example, the times are divided into half second intervals, but the skilled person will appreciate that different time intervals may be used as appropriate. At time t=0, the first event is received, meaning that only event combinations 001, 010 and 100 are available. As such, there are no values provided in the cells relating to the other combinations at this time. The degrees of certainty in FIG. 5 are expressed as probabilities between 0 and 1 in accordance with convention, but the skilled person will appreciate that these values can be converted to percentage values by multiplying them by 100.

In normal use, one would expect all three of the event types referred to in FIG. 5 to occur in a given interaction. In this example, therefore, if all three events occur, then the client device is classified as "normal". This can be seen from FIG. 5, for which the level of confidence associated with a "normal" classification is given as 1 for all possible times when all three events have occurred. Where only some of the events have occurred, the level of confidence for "normal and "abnormal" classifications varies depending on the probability that the ultimate outcome will either be that all three events have occurred (and thus the interaction will be "normal") or at least one event will not occur (and thus the interaction will be "abnormal"). These values can be interpreted from empirical data derived by observing interactions between client devices and web servers, and observing the ultimate outcome when a given collection of events has occurred at a given time. The skilled person will realise there are many ways to generate the probability look-up table. For example the underlying distribution of the arrival of events could be statistically modelled. A modelling approach rather than learning classifications directly from empirical data may be more appropriate when the data available is particularly sparse or the number of components in the evidence vector is particularly large.

In an alternative embodiment, following the classification of a client device, the lookup table in FIG. 5 can be updated. That is to say, the look-up table can be constantly updated by the activity of the classification server, improving the accuracy of the classification by analysis of events in real interactions. As such, while classification may take place by comparing the events in the evidence vector with one or more probability distributions (as represented by the look-up table), the method can further comprise updating those probability distributions in dependence of the classification.

For the sake of clarity, FIG. 5 does not take account of the order in which events occur, or the times at which they occur. The only determining factors are the types of events which have occurred and the time at which the first of the events has occurred. The skilled person would appreciate that these factors may be accounted for in a look up table of this kind. For example, further rows may be introduced for events occurring in different orders, or for events occurring at different times.

The manner in which the lookup table of FIG. 5 can be used to identify the classification times, or carry out provisional or final classifications is illustrated in FIGS. 6A to 6F.

Consider that the three events reflected in the look-up table are a server request log, an image request, and a JavaScript request. The first event entered into the evidence vector may be the server request log. At this point, the time is t=0 and the event status is 100. FIG. 6A highlights the information that can be used to make a provisional classification at this time, i.e. a probability of 0.59 of an abnormal classification and a probability of 0.41 of a normal classification.

FIG. 6B illustrates how at time t=0 a classification time may be determined in this example. The classification time is the time at which a classification can be determined with a predetermined level of confidence. In this case, the predetermined level of confidence is 98%. Accordingly, to determine the classification time, one proceeds along the rows associated with event status 100 until a level of confidence of at least 0.98 is reached. As can be seen from FIG. 6B, the classification time for this event status is t=2.5.

FIG. 6C relates to a later time t=1.5 when an image request is received. This is stored in the evidence vector 34 as described above. The event status is now 101 (reflecting that both the server request log and the image request have been received, but that no JavaScript request has been received). Using the look-up table, the provisional classification at time t=1.5 can be established on the basis of the probability of 0.97 that the interaction will ultimately be normal and 0.03 that the interaction will ultimately be abnormal. Moreover, the classification time can be recalculated, this time for event status 101. As can be seen, it is only at time t=4 that a level of confidence above 0.98 is achieved for event status 101. Accordingly, the classification time is set to t=4.

Provisional classifications can be established at any time, and are not limited to occasions on which further events occur. Thus, FIG. 6D highlights the values that can be used to carry out an additional provisional classification at time t=2. In this case, the event status remains 101, but using the look-up table one can see that the probabilities that the interaction will ultimately be considered normal and will ultimately be considered abnormal are 0.96 and 0.04 respectively (note, this is a change in these values from time t=1.5 illustrated in FIG. 6C).

In this example, at time t=3 the JavaScript request is received. The relevant values are highlighted in FIG. 6E. The event status is now 111, and the probabilities of normal and abnormal ultimate results are 1 and 0 respectively. Accordingly, recalculation of the classification time will result in a value of t=3, since the level of confidence for a classification of "normal" at this time exceeds 0.98. As such, because the classification time has been reached, a final classification of "normal" can be made.

As can be seen from FIGS. 6A to 6E, the classification time at which the final classification occurs can depend on the data in the evidence vector 34 since this provides the event status. In particular, the classification server 30 may calculate the classification time for a particular interaction ID according to the data stored in the evidence vector 34. Moreover, using the evidence vector and the look-up table, provisional classifications can be achieved at any time, while the final classification can also be established at the classification time.

FIGS. 4 and 6A to 6E illustrate the steps that occur in the classification of a particular interaction between a client device 10 and a web server 20. However, in the preferred embodiment of the present invention, the classification server 30 is used to classify a range of interactions between different client devices 10 and web servers 20. That is to say, although the classification of the interaction discussed with reference to FIGS. 4 and 6A to 6E reaches an end point, the classification server 30 continues to function, analysing other ongoing interactions between client devices 10 and web servers 20.

Figure 7:
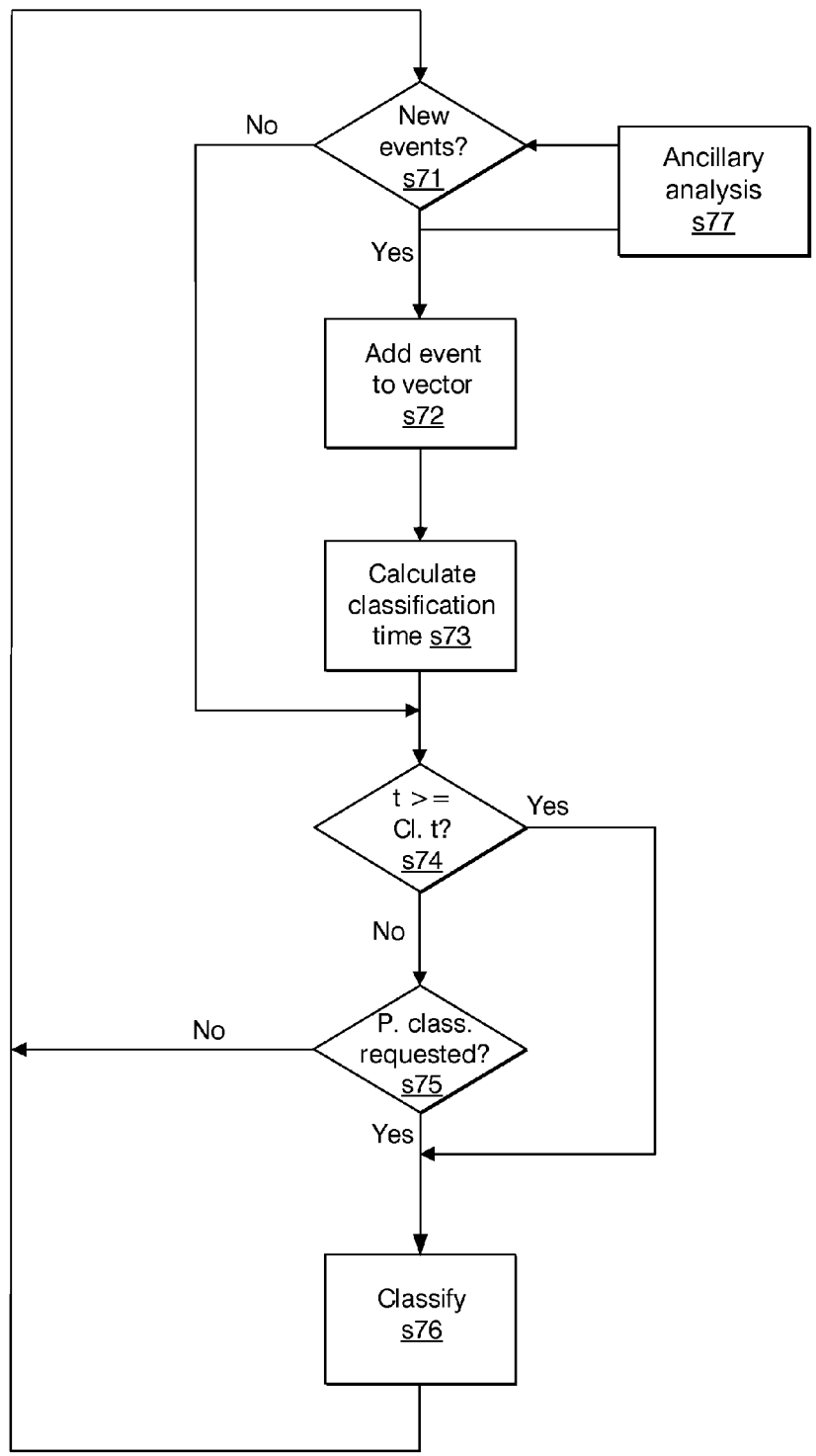
FIG. 7 is a flow diagram illustrating a repeating loop operated by a classification server in accordance with the preferred embodiment of the present invention.

In the preferred embodiment of the present invention, the ongoing operation of the classification server is implemented using a repeating control loop, schematically illustrated in FIG. 7.

The first step in the control loop, step s71, is to assess whether any new evidence has been received. New evidence is any indication of the occurrence of an event that has not yet been stored in the evidence vector 34. If no new evidence has been received, the method proceeds to step s74.

If new evidence has been received, then the events to which it relates are stored in the evidence vector at step s72. The events are stored against the interaction ID for the interaction to which they relate. As mentioned above, the interaction ID is generated by the web server 20 on receipt of the resource request by the client device 10 from the web server 20, and is then provided with all event information subsequently sent to the classification server 30. Each event stored in the evidence vector 34 is also stored with a time representing the time at which the event occurred.

The method then continues to step s73, where new classification times are calculated and stored in the evaluation time vector 36. This is because when a new event is stored it may alter the time at which the final classification should occur for that interaction. Accordingly, a new classification time is calculated for each interaction for which a new event has been stored since the classification time for that interaction was last calculated. Newly calculated classification times are stored in the evaluation time vector 36 against the interaction ID of the interaction to which they relate.

At step s74, an evaluation is made as to whether the current time (t) is greater than or equal to any one of the classification times (Cl. t). If so, the method proceeds to step s76 for the interaction ID(s) associated with the classification time(s) that have been reached. If not, the method proceeds to step s75.

At step s75, the classification server 30 identifies whether any requests for a provisional classification have been received. If so, the method proceeds to step s76 for the interaction ID(s) associated with the requests for provisional classification. If not, the method returns to step s71. Requests for provisional classification may be received from the web servers 20, for example, and may depend on activities undertaken during the interaction between a client device 10 and the web server 20. For example, the client device 10 may attempt to access sensitive content held on the web server 20, and in response to this the web server 20 may send a request for provisional classification to the classification server 30.

At step s76, classification is carried out. This may be either provisional or final classification in accordance with the judgments made at steps s74 and s75. In either case, classification is carried out for each interaction ID in dependence on the information stored in the evidence vector 34 for that ID. As explained above, this information includes both the events that have occurred during an interaction between a client device 10 and the web server 20 and the times at which these events occurred. Accordingly, for a given interaction ID, the evidence vector 34 provides a sequence of events. This sequence of events can be compared with probabilistic models for various types of agent controlling the client device 10, and the client device 10 can be so classified.

Where the classification carried out at step s76 is a final classification, the information relating to the particular interaction ID in the evidence vector 34 and evaluation time vector 36 are consumed, i.e. removed from those vectors. However, the information from the evidence vector 34 is written into the classification vector 38, together with the classification itself. This allows the results of the final classification to be later accessed an analysed if required.

After step s76 has occurred, the method returns to step s71 and repeats. This loop continues as long as the classification server 30 is operational. In the case where the classification server 30 is initiated, the step of classification s76 is skipped for a period of time max_t which represents the maximum time period that is likely to elapse between the first event in a given interaction and the last event, to a predetermined level of confidence, such as 95%. Where possible, this avoids misclassifications being made on the basis of incomplete sets of events that do not include events that occurred before initiation of the classification server 30.

FIG. 7 also shows a step s77 of carrying out ancillary analysis. Although shown as part of the control loop in FIG. 7, this step may be carried out independently. In particular, it is not necessary for the rest of the control loop to await completion of ancillary analysis in order to continue.

Ancillary analysis s77 may involve analysing particular events in detail. For example, where the event is a mouse movement or other input to the client device 10, the ancillary analysis may examine the content of that event for indications as to the type of agent controlling the client device 10. This is in addition to storing the fact that the event has occurred, and the time at which it occurred, in the evidence vector 34. The ancillary analysis may therefore provide further valuable information for use in classification of the client device 10.

Results from any ancillary analysis may be stored in the evidence vector 34 for use during both provisional and final classifications. Alternatively, the results from the ancillary analysis may be stored elsewhere and the step of classification s76 may be divided between processing the evidence vector 34 and subsequently applying the results of the ancillary analysis s77.

In some examples, ancillary analysis s77 may be ongoing when the classification time is reached. In preferred embodiments, the final classification is then suspended until the results of the ancillary analysis are available and can be accounted for in the classification. The weight given to the ancillary analysis may vary according to the type of event being analysed, and can vary from overriding analysis of event occurrences and times to merely biasing the final classification in a particular direction.

Although FIG. 7 shows the calculation of classification times, the classification itself and the ancillary analysis as part of a combined control loop, the skilled person will appreciate that the invention could be implemented in other ways as appropriate. In particular, provisional classification may be controlled by a separate loop to final classification, occurring in response to request for a provisional classification without the need to first go through the steps of checking for additional events, storing them in the evidence vector, and so on. In this manner, the delay in providing provisional classifications can be minimised.

As explained above, classification of a client device 10 is carried out using the events collated in the evidence vector 34 for a particular interaction, together with the information stored therein relating to the time at which those events occurred. However, there may also be additional considerations that could also be taken into account when classifying the client device 10. For example, these considerations may have an effect on the round trip time for messages between the client device 10 and the web server 20 the distribution and deviation of evidential events, and the likelihood of evidential events not being received due to unreliable communications channels. These additional considerations include: the geographical locations of the client device 10, the web server 20 and the classification server 30; the load on the web server 20 and the classification server 30; the browser used by the client device 10 to access the web server 20; the physical nature of the client device 10 itself; the Internet Service Provider (ISP) used by the client device; and the various participating entities' upload and download speeds.

The above description relates to an embodiment of the present invention in which events are processed in real time. However, in an alternative embodiment, the events may be processed in discrete sets or batches. This might be, for example, for use in a batch-oriented map-reduce framework or to classify historical data. In such an embodiment events may first be stored for subsequent processing, they may then by added to evidence vectors as part of a batch operation, ancillary analysis may also proceed as part of a batch operation, classification times for all these evidence vectors could then be computed as a batch operation, and then, for those evidence vectors with suitable classification times, classifications may then finally be produced as part of a final batch operation.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A computer-implemented method for classifying an agent controlling a client device requesting content from a server, comprising:
   generating a probability look-up table, comprising a plurality of abnormal probability values, each abnormal probability value corresponding to a sequence of events at a corresponding time;
   receiving, from a server, a first event identifying a first request for content made by a client device to the server;
   storing the received first event in an evidence vector, together with the time the first request was made;
   receiving, from the server, a second event identifying a second request for content made by the client device to the server;
   storing the received second event in the evidence vector, together with the time the second request was made;
   processing the evidence vector to derive a sequence of events;
   selecting, from the probability look-up table, a list of abnormal probability values, each abnormal probability value corresponding to the sequence of events;
   finding an abnormal probability value from the selected list that has a lowest corresponding time among every abnormal probability value in the list that are greater than a predetermined level of confidence;
   setting a classification time to a time corresponding to the found abnormal probability value, the classification time representing a time at which a probability that an agent controlling the client device is illegitimate exceeds a predetermined threshold; and
   classifying the agent controlling the client device requesting content from the server as illegitimate, when the time period represented by the difference between the classification time and the time of the first request has elapsed.

2. The method of claim 1, wherein processing the evidence vector comprises processing the evidence vector using a timing of events in the evidence vector.

3. The method of claim 1, further comprising updating the classification time at regular intervals before the time period represented by the difference between the classification time and the time of the first request has elapsed.

4. The method of claim 1, further comprising
   provisionally classifying an agent controlling the client device requesting content from the server as illegitimate, responsive to determining that the time period represented by the difference between the classification time and the time of the first request has not elapsed.

5. The method of claim 1, wherein generating a probability look-up table further comprises one or more of:
   observing interactions between a second client device and a second web server;
   observing an outcome of the interactions; and
   generating a probability value in the look-up table using the outcome and the interactions.

6. The method of claim 1, further comprising
   updating, responsive to classifying the agent, the probability look-up table by updating the abnormal probability value related to the determined classification time.

7. The method of claim 1, wherein generating a probability look-up table comprises
   generating a probability value in the look-up table by statistically modelling a probability distribution function.

8. The method of claim 7, wherein generating a probability value comprises
   generating a probability value in the look-up table by statistically modelling a probability distribution function in response to one of:
   determining that a number of data points available to generate the probability value is less than a threshold number of data points; and
   determining that a number of components in a evidence vector is greater than a threshold.

9. The method of 1, further comprising:
   carrying out ancillary analysis on a behavioral event associate with at least one of the events that has occurred; and
   storing results of the ancillary analysis in the evidence vector.

10. The method of claim 1, further comprising controlling the access of the client device to the server responsive to classifying the agent as illegitimate.

11. An apparatus for classifying a client device requesting content from a server, the apparatus comprising:
    a classification server computer; and
    a data storage device operably connected to the classification server computer, the data storage device storing instructions configured to direct the classification server computer to:
    generate a probability look-up table, comprising a plurality of abnormal probability values, each abnormal probability value corresponding to a sequence of events at a corresponding time;
    receive, from a server, a first event identifying a first request for content made by a client device to the server;
    store the received first event in an evidence vector, together with the time the first request was made;
    receive, from the server, a second event identifying a second request for content made by the client device to the server;
    store the received second event in the evidence vector, together with the time the second request was made;
    process the evidence vector to derive a sequence of events;
    select, from the probability look-up table, a list of abnormal probability values, each abnormal probability value corresponding to the sequence of events;
    find an abnormal probability value from the selected list that has a lowest corresponding time among every abnormal probability value in the list that are greater than a predetermined level of confidence;
    set a classification time to a time corresponding to the found abnormal probability value, the classification time representing a time at which a probability that an agent controlling the client device is illegitimate exceeds a predetermined threshold; and
    classify an agent controlling the client device requesting content from the server as illegitimate, when the time period represented by the difference between the classification time and the time of the first request has elapsed.

12. The apparatus of claim 11, wherein the data storage device stores further instructions to:
   select a probability function associated with the first event in the evidence vector; and
   determine a classification time using the probability function, the classification time related to an abnormal probability value that is greater than or equal to a predetermined level of confidence.

* * * * *